US012724631B2

(12) United States Patent
Xu et al.

(10) Patent No.: US 12,724,631 B2
(45) Date of Patent: Sep. 1, 2026

(54) BILL-OF-MATERIALS-DRIVEN VIRTUAL INFRASTRUCTURE DEPLOYMENT

(71) Applicant: VMware, Inc., Palo Alto, CA (US)

(72) Inventors: Emily Hong Xu, Palo Alto, CA (US); Russell Jew, San Francisco, CA (US); Rama Koteswari Sudireddi, Cupertino, CA (US)

(73) Assignee: VMware LLC, Palo Alto, CA (US)

( * ) Notice: Subject to any disclaimer, the term of this patent is extended or adjusted under 35 U.S.C. 154(b) by 588 days.

(21) Appl. No.: 18/323,248

(22) Filed: May 24, 2023

(65) Prior Publication Data

US 2024/0394090 A1 Nov. 28, 2024

(51) Int. Cl.
*G06F 9/455* (2018.01)
*G06F 9/50* (2006.01)

(52) U.S. Cl.
CPC ...... *G06F 9/45558* (2013.01); *G06F 9/45533* (2013.01); *G06F 9/50* (2013.01); *G06F 2009/45562* (2013.01); *G06F 2009/4557* (2013.01); *G06F 2009/45583* (2013.01)

(58) Field of Classification Search
CPC ............... G06F 9/45558; G06F 9/5077; G06F 2009/45562; G06F 2009/4557; G06F 2009/45583; G06F 9/45533; G06F 9/50
USPC ........................................................... 718/1
See application file for complete search history.

(56) References Cited

U.S. PATENT DOCUMENTS

| | | | | |
|---|---|---|---|---|
| 10,491,662 | B2 * | 11/2019 | Srikanth | G06F 16/958 |
| 2018/0115585 | A1 * | 4/2018 | Rubakha | G06F 21/53 |
| 2019/0213104 | A1 * | 7/2019 | Qadri | H04L 67/1097 |
| 2019/0333018 | A1 * | 10/2019 | Chaganti | G06F 16/2255 |
| 2022/0121470 | A1 * | 4/2022 | Saxena | H04L 63/20 |
| 2022/0147350 | A1 * | 5/2022 | Lochhead | H04L 41/0894 |
| 2023/0038226 | A1 * | 2/2023 | Wilson | G06F 11/302 |

* cited by examiner

*Primary Examiner* — Jacob D Dascomb
(74) *Attorney, Agent, or Firm* — Kim & Stewart LLP

(57) ABSTRACT

A method of deploying virtual infrastructure on hardware infrastructure to support execution of software on the virtual infrastructure, includes the steps of: retrieving a hardware bill of materials (BOM) separately for each of a plurality of hardware devices of a group of hardware devices by using identifying information of each of the plurality of hardware devices, wherein the retrieved hardware BOMs include details about hardware components of different hardware device models corresponding to the plurality of hardware devices; determining, based on the details from the retrieved hardware BOMs, policies to apply to a deployment of the virtual infrastructure on the plurality of hardware devices; and deploying the virtual infrastructure on the plurality of hardware devices according to the determined policies.

18 Claims, 4 Drawing Sheets

200
210
220

```
{
  “id”: “unique-id”,
  “name”: “n3.xlarge.opt-m4”,
  “vendor_id”: “equinix-vendor-id”,
  "cpu": {
    "count": 1
  },
  "memory": {
    "type": "DDR5"
  },
  "storage": {
    "cache_disk": {
      "type": "NVMe"
    },
    "boot_disk": {
      "type": "NVMe"
    },
    "capacity_disk": {
      "type": "NVMe"
    }
  },
  "compatibility_spec": {
    "cpus": [
      {
        "name": "Intel Xeon Gold 6314U",
        "generation": "Ice-Lake",
        "speed": {
          "value": 2.3,
          "unit": "Ghz"
        },
        "core_count": 32
      }
    ],
    "nics": [
      {
        "name": "Intel E810-XXVDA4",
        "speed": {
          "value": 25.0,
          "unit": "GbE"
        },
        "ports": 4
      }
    ]
  }
}
```

Figure 2

BILL-OF-MATERIALS-DRIVEN VIRTUAL INFRASTRUCTURE DEPLOYMENT

BACKGROUND

In a software-defined data center (SDDC), virtual infrastructure, which includes virtual compute, storage, and networking resources, is deployed from hardware infrastructure. For example, the hardware infrastructure may include a plurality of host computers, referred to herein as "hosts," storage devices such as storage arrays, and networking devices such as switches. Thereafter, applications execute in virtual computing instances running in the SDDC, such as virtual machines (VMs) and containers.

In many cases, a software provider is responsible both for delivering software for deploying the virtual infrastructure and also for procuring the hardware devices of the hardware infrastructure. In such an integrated model, the software provider delivers the deployment software and hardware devices together. This model is simple from a customer's perspective because the customer does not need to separately procure hardware for running the deployment software. However, this model is also limiting with respect to customers that have varying needs for hardware configurations. Indeed, such software providers typically procure only a small variety of different hardware device models for deploying virtual infrastructure on.

There is a growing move from such an integrated model to a decoupled model. According to a decoupled model, also known as a bring-your-own-hardware (BYOH) model, the customer is allowed to buy or rent hardware devices from one or more third-party hardware providers. Customers thus have the flexibility to choose preferred hardware providers and units of preferred hardware device models. However, supporting hardware device models from a variety of different hardware providers presents challenges. Software providers must ensure that the deployment software is executable on many different hardware device models with varying capabilities. To do so, software providers test respective deployment software on units of different hardware device models and then certify hardware device models that satisfy predetermined performance standards.

A software provider hardcodes logic in a deployment service that communicates with the deployment software to deploy the virtual infrastructure. The logic is based on the different certified hardware device models, specifically on details about the different components of the hardware device models. For example, different hosts include different central processing units (CPUs), memory devices such as random-access memory (RAM), storage devices such as magnetic drives or solid-state drives (SSDs), and network interface cards (NICs). To deploy the virtual infrastructure optimally on different hosts, the logic must account for differences such as clock speeds of different CPUs, sizes of different memory devices, capacities of different storage devices, and bandwidths supported by ports of different NICs. Hardcoding such logic requires frequent updates to the deployment service as more hardware device models are certified. Such hardcoding is unscalable, especially for a deployment service that includes several microservices that are each hardcoded with portions of the logic. A process for deploying virtual infrastructure is needed that is scalable in a BYOH model.

SUMMARY

One or more embodiments provide a method of deploying virtual infrastructure on hardware infrastructure to support execution of software on the virtual infrastructure. The method includes the steps of: retrieving a hardware bill of materials (BOM) separately for each of a plurality of hardware devices of a group of hardware devices by using identifying information of each of the plurality of hardware devices, wherein the retrieved hardware BOMs include details about hardware components of different hardware device models corresponding to the plurality of hardware devices; determining, based on the details from the retrieved hardware BOMs, policies to apply to a deployment of the virtual infrastructure on the plurality of hardware devices; and deploying the virtual infrastructure on the plurality of hardware devices according to the determined policies.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 2 is a block diagram illustrating a sample of a hardware bill of materials that may be used by embodiments.

DETAILED DESCRIPTION

Figure 1:
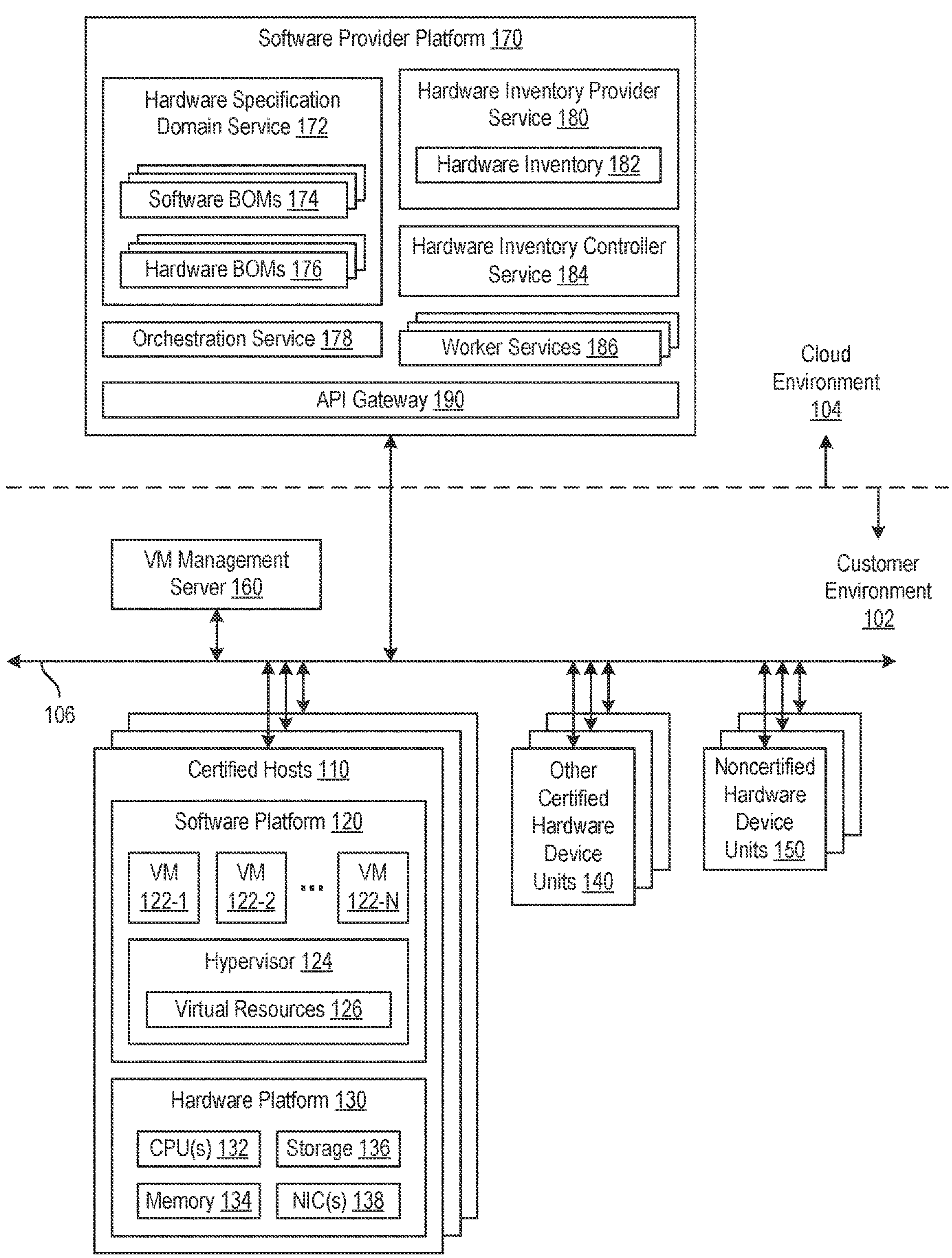
FIG. 1 is a block diagram of a virtualized computer system in which embodiments may be implemented.

Techniques for deploying virtual infrastructure in a BYOH model are described. Such techniques utilize hardware bills of materials (BOMs), which are comprehensive lists of hardware components that make up units of hardware device models. Hardware BOMs also include details about the constituent components such as details about CPUs, memory devices, storage devices, and NICs. All the hardware BOMs for certified hardware device models, including those from different hardware providers, are centrally stored by a cloud-based software provider platform.

A customer specifies hardware device units that the customer has purchased or is interested in purchasing. The software provider platform checks the hardware BOMs to verify which of the units correspond to hardware device models that have been certified for executing a deployment software. A hardware device model is certified if the software provider platform has a corresponding hardware BOM. The software provider platform then checks the details within the hardware BOMs to determine policies to apply to a deployment of the virtual infrastructure on the customer's units of certified hardware device models. For example, such policies include reserving a predetermined amount of compute resources for a customer's VMs without exceeding a threshold.

In addition to the hardware BOMs, there are lists of tasks referred to herein as software BOMs, each software BOM corresponding to a particular arrangement for the deployment software. For example, each software BOM may correspond to a version of the deployment software. As another example, each software BOM may correspond to a storage configuration for the virtual infrastructure. Each software BOM represents configurations of software components of the deployment software. As with the hardware BOMs, the software BOMs are centrally stored by the software provider platform. Deploying the virtual infrastructure includes retrieving the software BOM corresponding to the customer's arrangement for the deployment software and executing the tasks therein.

According to embodiments, supporting a newly certified hardware device model merely involves the software provider platform storing another hardware BOM. No changes are made to microservices of the software provider platform that communicate with the deployment software to deploy the virtual infrastructure. Techniques are thus scalable with increasing numbers of different hardware device models. Furthermore, through the software BOMs, the microservices support customers that use a variety of different arrangements for the deployment software. No changes are made to the microservices for the arrangement-specific tasks to perform.

In addition to the above advantages, centrally storing hardware BOMs also simplifies the task for customers determining whether particular hardware device models are supported. Customers simply make API calls to the software provider platform, and the software provider platform identifies which of a group of hardware device units correspond to certified hardware device models. Additionally, centrally storing hardware BOMs organizes the management of certifying hardware device models for the software provider. These and further aspects of the invention are discussed below with respect to the drawings.

FIG. 1 is a block diagram of a virtualized computer system in which embodiments may be implemented. The virtualized computer system includes a customer environment 102 and a cloud environment 104. As used herein, a "customer" is an organization to which a software provider platform 170 of cloud environment 104 provides a deployment software. A "customer environment" is one or more private data centers managed by the customer (commonly referred to as "on-premise" data centers), a private cloud managed by the customer, a public cloud managed for the customer by another organization such as for a distributed cloud, or any combination of these. Software provider platform 170 executes in a public cloud.

Customer environment 102 includes units of hardware device models that are certified for executing the deployment software, such units including certified hosts 110 and other certified hardware device units 140. For example, certified hosts 110 may be a cluster of physical servers, and other certified hardware device units 140 may be storage arrays and networking switches. Customer environment 102 also includes noncertified hardware device units 150, which are units of hardware device models that have not been certified for executing the deployment software. Noncertified hardware device units 150 are out of scope for deploying virtual infrastructure on and are instead used separately by the customer. For example, noncertified hardware device units 150 may be hosts, storage arrays, and networking switches that are unable to adequately support execution of the deployment software. Noncertified hardware device units 150 may also have not yet been tested to determine certification therefor.

Each of certified hosts 110 is constructed on a hardware platform 130 such as an x86 architecture platform. Hardware platform 130 includes conventional components of a computing device, such as one or more CPUs 132, memory 134 such as RAM, local storage 136 such as one or more magnetic drives or SSDs, and one or more NICs 138. Local storage 136 of certified hosts 110 may optionally be aggregated and deployed as a virtual storage area network (vSAN). NICs 138 enable certified hosts 110 to communicate with each other and with other devices over a network 106 such as a local area network.

Hardware platform 130 of each of certified hosts 110 supports a software platform 120. Software platform 120 includes a hypervisor 124, which is a virtualization software layer. One example of hypervisor 124 is a VMware ESX® hypervisor, available from VMware, Inc. Hypervisor 124 supports a VM execution space within which VMs 122 are concurrently instantiated and executed. A software application of the customer (not shown) executes in VMs 122, such execution being supported by virtual resources 126. Although the disclosure is described with reference to VMs, the teachings herein also apply to other types of virtual computing instances such as containers, Docker® containers, data compute nodes, and isolated user space instances for which the deployment software deploys virtual infrastructure on units of certified hardware device models. Hypervisor 124 includes virtual resources 126, which include virtual compute, storage, and networking resources. Virtual resources 126 are deployed by the deployment software for VMs 122 from CPU(s) 132, memory 134, storage 136, and NIC(s) 138 of hardware platform 130.

VM management server 160 is one software component of the deployment software that deploys virtual resources on certified hosts 110 according to instructions from software provider platform 170. VM management server 160 also logically groups certified hosts 110 into a cluster to perform cluster-level tasks such as managing VMs 122 and migrating VMs 122 from one of certified hosts 110 to another. VM management server 160 communicates with certified hosts 110 via a management network (not shown) provisioned from network 106. For example, VM management server 160 may be one of VMs 122. One example of VM management server 160 is VMware vCenter Server,® available from VMware, Inc. Customer environment 102 also includes other software components of the deployment software (not shown) that deploy virtual infrastructure on other certified hardware device units 140.

Software provider platform 170 includes a plurality of microservices, including a hardware specification domain service 172, an orchestration service 178, a hardware inventory provider service 180, a hardware inventory controller service 184, and worker services 186. The microservices run in a VM or in one or more containers and are deployed on hardware infrastructure of a public computing system (not shown). The hardware infrastructure supporting software provider platform 170 includes the conventional components of a computing device discussed above with respect to hardware platform 130. CPU(s) of the hardware infrastructure are configured to execute instructions such as executable instructions that perform one or more operations described herein, which may be stored in memory of the hardware infrastructure.

Software provider platform 170 communicates with devices of customer environment 102 to deploy the virtual infrastructure on certified hosts 110 and other certified hardware device units 140. Such communication is made over a wide area network (WAN). The customer also communicates with software provider platform 170 through API calls made via an API gateway 190. For example, the customer makes such API calls to view the deployment of the virtual infrastructure and to request changes thereto.

Hardware specification domain service 172 maintains a plurality of software BOMs 174 and a plurality of hardware BOMs 176. Each of software BOMs 174 is a list of tasks to perform on software components of the deployment software such as VM management server 160 based on an arrangement for the deployment software. For example, arrangements may be based on different versions of the deployment software. As another example, arrangements may be based on different storage configurations for the virtual infrastructure such as different RAID levels that offer varying levels of performance and data redundancy. Each of hardware BOMs 176 provides details about components of a certified hardware device model. The certified hardware device models are from a plurality of different hardware providers such as Equinix, Amazon Web Services, Hewlett Packard Enterprise, etc. A sample of one of hardware BOMs 176 is illustrated in FIG. 2 and discussed below.

Administrators of software provider platform 170 test the deployment software on units of different hardware device models to determine if the hardware device models satisfy predetermined performance standards. Those hardware device models that satisfy the standards are certified, and the administrators add corresponding hardware BOMs to hardware specification domain service 172. Additionally, the administrators occasionally modify hardware BOMs of hardware specification domain service 172. For example, if there is a shortage of a component of a hardware device model such as a particular CPU, a hardware provider may substitute a new component. An administrator may then test a unit of the hardware device model with the substituted component, certify the modified hardware device model, and update the corresponding one of hardware BOMs 176 to include the substituted component.

Additionally, the administrators occasionally deprecate hardware BOMs of hardware specification domain service 172. For example, a previously certified hardware device model may reach its "end of life," at which point the associated hardware provider no longer sells units of the hardware device model and no longer provides software updates therefor. In such a case, an administrator deprecates the corresponding one of hardware BOMs 176, e.g., by updating a tag therein. Such a change does not affect units of that hardware device model that are already executing the deployment software. However, the change prevents installation of the deployment software onto new units of that hardware device model.

Hardware inventory provider service 180 maintains a hardware inventory 182 for the customer, which includes details about the customer's hardware device units that correspond to certified hardware device models. Upon request, the microservices of software provider platform 170 determine which units of customer environment 102 correspond to certified hardware device models. Hardware inventory provider service 180 then populates hardware inventory 182 accordingly, as discussed further below in conjunction with FIG. 3. Furthermore, before even renting or buying hardware device units, the customer may make API calls to software provider platform 170 to request a list of certified hardware device models. The microservices identify the hardware device models from hardware BOMs 176 and return a list to the customer. After the customer rents or buys units of certified hardware device models, the microservices deploy virtual infrastructure thereon through the deployment software, including virtual resources 126 of certified hosts 110, as discussed further below in conjunction with FIG. 4.

FIG. 2 is a block diagram illustrating a sample of one of hardware BOMs 176 that may be used by embodiments. Lines 200 of the hardware BOM include identifying information that is used by hardware specification domain service 172 to locate the hardware BOM. The identifying information includes an "id" attribute, the value of which is a unique identifier corresponding to an associated hardware device model. The identifying information further includes a "name" attribute, the value of which is a name of the hardware device model. The identifying information further includes a "vendor_id" attribute, the value of which is an identifier for a particular hardware provider.

Lines 210 of the hardware BOM include details about components of the hardware device model. Such components include a CPU, memory device, and storage device. According to the details, units of the hardware device model have one CPU, a memory device of a type "DDR5" (double data rate 5), and three storage devices. The three storage devices include a "cache_disk," a "boot_disk," and a "capacity_disk," each of a type nonvolatile memory express ("NVMe"). Although not included in FIG. 2 for brevity, lines 210 in practice also include more information that is used for deploying virtual infrastructure such as a size of the memory device and a capacity of the storage device.

Lines 220 of the hardware BOM are an optional section that is used according to certain embodiments. According to such embodiments, for one or more types of components, the hardware device model is certified with different options. As discussed earlier, a hardware provider may at least temporarily substitute a particular component such as a different CPU if there is a shortage of the original component. As another example, a hardware provider may provide the option for the customer to customize a hardware device unit such as with options for different sizes for memory. In response, the administrators of software provider platform 170 add alternative components to the hardware BOM, thus creating multiple certified variants of the same hardware device model. In other words, the administrators create a series of certified hardware device variants corresponding to the same hardware BOM.

According to lines 220, a certified variant of the hardware device model includes a CPU named "Intel Xeon Gold 6314U" with particular specifications such as a clock speed of 2.3 GHz and 32 cores. Additionally, according to lines 220, a certified variant includes a NIC named "Intel E810-XXVDA4" with a supported bandwidth of 25.0 GbE and 4 ports. Although not included in FIG. 2 for brevity, in practice, lines 220 include details about additional CPUs and/or additional NICs for certified variants with different CPUs and/or different NICs.

Figure 3:
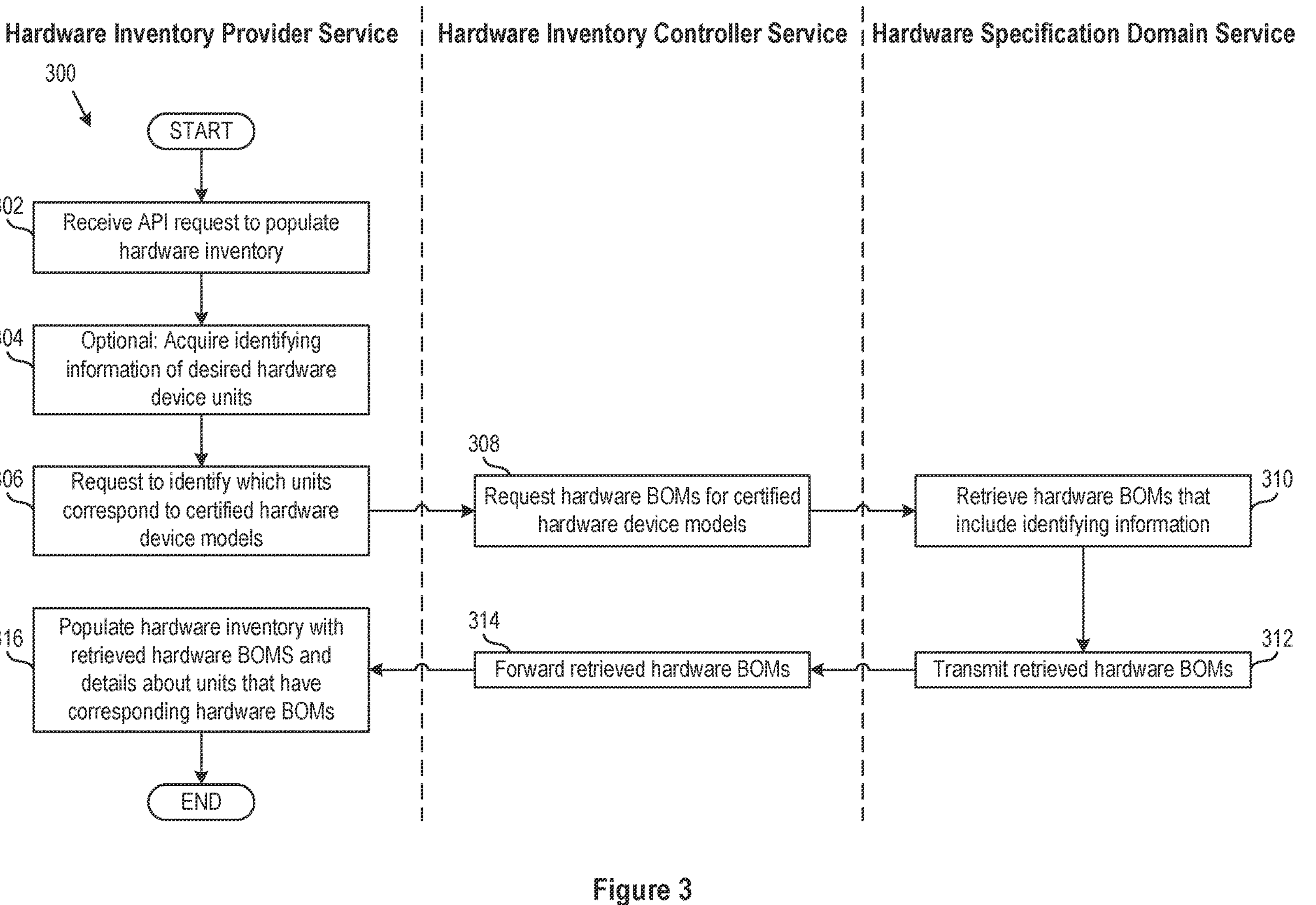
FIG. 3 is a flow diagram of a method performed by microservices of a software provider platform to populate a customer's hardware inventory with details about units of certified hardware device models, according to an embodiment.

FIG. 3 is a flow diagram of a method 300 performed by the microservices to populate hardware inventory 182 with details about the customer's units of certified hardware device models, according to an embodiment. Method 300 is performed after administrators of software provider platform 170 have tested and certified a plurality of hardware device models from various hardware providers. The administrators then stored hardware BOMs of certified hardware device models in hardware specification domain service 172. The administrators have also stored software BOMs in hardware specification domain service 172, each software BOM corresponding to a different arrangement for the deployment software.

At step 302, hardware inventory provider service 180 receives an API request from customer environment 102 via API gateway 190 to populate hardware inventory 182. The API request includes details for identifying hardware device models corresponding to hardware device units that the customer desires to use. For example, the details may be identifying information such as unique identifiers and names of hardware device models and identifiers of hardware providers. As another example, the details may be credentials for accessing a private online portal of a hardware provider from which the customer has purchased or rented hardware device units.

At step 304, as an optional step, hardware inventory provider service 180 acquires identifying information corresponding to the customer's desired hardware device units. For example, if the API request from step 302 included credentials, hardware inventory provider service 180 accesses the private online portal using the credentials to acquire the identifying information. If the details of step 302 included the identifying information, step 304 is not needed. At step 306, hardware inventory provider service 180 transmits the identifying information to hardware inventory controller service 184 along with a request to identify which of the desired hardware device units correspond to certified hardware device models.

At step 308, hardware inventory controller service 184 transmits the identifying information to hardware specification domain service 172 along with a request for hardware BOMs of certified hardware device models. At step 310, hardware specification domain service 172 retrieves the corresponding hardware BOMs by checking hardware BOMs 176, the corresponding hardware BOMs including the identifying information. Any of the desired hardware device units that correspond to noncertified hardware device models do not have corresponding hardware BOMs. In other words, all of the customer's desired hardware device units may correspond to certified hardware device models, or some units may not. At step 312, hardware specification domain service 172 transmits the retrieved hardware BOMs to hardware inventory controller service 184.

At step 314, hardware inventory controller service 184 forwards the retrieved hardware BOMs to hardware inventory provider service 180. At step 316, hardware inventory provider service 180 populates hardware inventory 182 with the retrieved hardware BOMs and details about each of the customer's desired hardware device units corresponding to certified hardware device models. For example, the details include identifying information of the certified hardware device models and a quantity of units of each of the models in customer environment 102. After step 316, method 300 ends.

Figure 4:
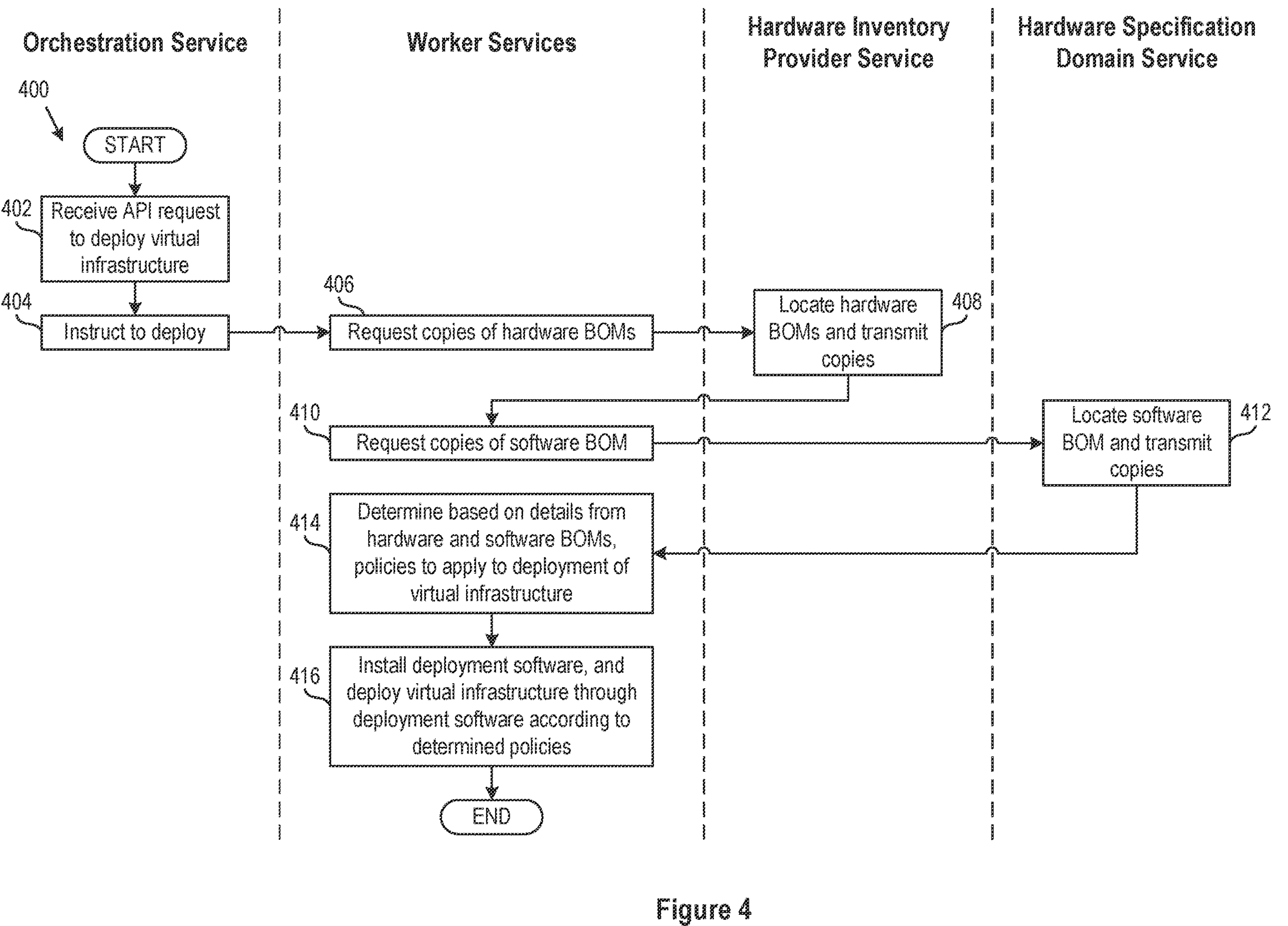
FIG. 4 is a flow diagram of a method performed by microservices of the software provider platform to deploy virtual infrastructure on the units, according to an embodiment.

FIG. 4 is a flow diagram of a method 400 performed by the microservices to deploy virtual infrastructure on the customer's hardware device units that correspond to certified hardware device models, according to an embodiment. Method 400 is performed after hardware inventory provider service 180 populated hardware inventory 182 with hardware BOMs corresponding to the customer's units of certified hardware device models and details about the hardware device units. At step 402, orchestration service 178 receives an API request from the customer to deploy the virtual infrastructure on the hardware device units. The API request specifies which of the customer's hardware device units captured in hardware inventory 182 to deploy the virtual infrastructure on. The API request also identifies details of the deployment such as one or more geographical regions in which such hardware device units are located and networking information for connecting to the hardware device units such as internet protocol (IP) addresses thereof.

At step 404, orchestration service 178 transmits an instruction to each of worker services 186 to deploy the virtual infrastructure, including the specified hardware device units and details of the deployment. Orchestration service 178 specifies in its instruction an arrangement for the deployment software. For example, the arrangement may be a latest version of the deployment software that has been predetermined by administrators to be supported by the hardware device units. As another example, the arrangement may be a storage configuration for the virtual infrastructure that is automatically selected internally by software provider platform 170, e.g., based on details about the hardware device units or other factors, as discussed further below. At step 406, each of worker services 186 transmits a request to hardware inventory provider service 180 for copies of the hardware BOMs corresponding to the specified hardware device units.

At step 408, hardware inventory provider service 180 locates the corresponding hardware BOMs in hardware inventory 182 according to identifying information in the hardware BOMs. Hardware inventory provider service 180 then transmits copies of each of the retrieved hardware BOMs to each of worker services 186. At step 410, each of worker services 186 transmits a request to hardware specification domain service 172 for a copy of a software BOM corresponding to the arrangement for the deployment software. At step 412, hardware specification domain service 172 locates one of software BOMs 174 corresponding to the arrangement. Hardware specification domain service 172 then transmits a copy of the software BOM to each of worker services 186.

At step 414, each of worker services 186 determines based on details from copies of the hardware BOMs transmitted at step 408 and a copy of the software BOM transmitted at step 412, policies to apply to a deployment of the virtual infrastructure on the hardware device units. As a first example, one of worker services 186 aggregates storage devices of the hardware device units into a vSAN based on storage device types (e.g., SSDs) and capacities. As a policy, the worker service reserves a predetermined amount of the aggregated storage devices for VMs of the virtual infrastructure without exceeding a threshold. Later, if the threshold is reached, the customer may be alerted that disaster recovery mechanisms may be lost such as migrating VMs in the event of a host failing.

As a second example, based on the total capacity of storage and the different types of storage devices, the worker service determines, as a policy, how to deploy the virtual infrastructure on the storage devices. In particular, the worker service determines to deploy the virtual infrastructure to achieve a predetermined efficiency of storing data in the storage devices and a predetermined redundancy of storing data in the storage devices, e.g., selecting an optimal RAID level. As a third example, one of worker services 186 aggregates compute resources of CPUs of the hardware device units based on numbers of CPU cores and CPU clock speeds. As a policy, the worker service reserves a predetermined amount of the aggregated compute resources for VMs of the virtual infrastructure without exceeding a threshold. Later, if the threshold is reached, the customer may be alerted that performance of the virtual infrastructure may degrade and that disaster recovery mechanisms may be lost such as migrating VMs in the event of a host failing.

As a fourth example, one of worker services 186 determines numbers of ports and bandwidths supported by ports of NICs of the hardware device units. Then, as a policy, the worker service determines how to create network connections for each of the ports of the NICs to achieve various objectives. Such ports may be connected to top-of-rack switches from other certified hardware device units 140 to support the customer's application. The objectives may include, e.g., avoiding overloading the bandwidths supported by the ports, load balancing network traffic between the NICs to optimize networking performance, and saving enough overall bandwidth to support disaster recovery mechanisms.

At step 416, worker services 186 install the deployment software on the hardware device units, including installing VM management server 160. Worker services 186 then deploy virtual infrastructure on the hardware device units through the deployment software according to the policies determined at step 414. For example, to deploy virtual resources 126, worker services 186 transmit deployment instructions to VM management server 160, which then deploys virtual resources 126 across certified hosts 110.

Worker services 186 deploy the virtual infrastructure based on corresponding sections of the hardware BOMs. For example, a first one of worker services 186 deploys virtual networking resources based on sections of the retrieved hardware BOMs corresponding to NICs 138 of certified hosts 110. The first worker service deploys the virtual networking resources according to policies determined based on the respective sections of the hardware BOMs, e.g., to avoid overburdening the physical networking resources of any of certified hosts 110. Similarly, a second one of worker services 186 deploys virtual storage resources based on sections of the retrieved hardware BOMs corresponding to storage devices 136 of certified hosts 110. The second worker service deploys the virtual storage resources according to policies determined based on the respective sections of the hardware BOMs, e.g., to avoid overburdening the physical storage resources of any of certified hosts 110.

Worker services 186 also deploy the virtual infrastructure based on corresponding sections of the software BOM. For example, one of worker services 186 performs tasks from a section of the software BOM corresponding to VM management server 160. Examples of such tasks include creating certificates or allocating a predetermined number of IP addresses for usage by VM management server 160 to perform functionalities thereof. After step 416, method 400 ends, and one or more applications execute on the deployed virtual infrastructure.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are magnetic drives, SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest operating system (OS) that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of deploying virtual infrastructure of a software provider by a plurality of microservices including a first microservice and a second microservice, wherein the virtual infrastructure is deployed on hardware infrastructure to support execution of software on the virtual infrastructure, the method comprising:

retrieving, from a plurality of hardware bills of materials (BOMs), a subset of the plurality of hardware BOMs associated with a plurality of hardware devices of a user of the virtual infrastructure, by matching specified identifying information of the plurality of hardware devices to identifying information contained in the retrieved hardware BOMs, wherein each of the retrieved hardware BOMs corresponds to a hardware device model of one or more of the plurality of hardware devices and comprises details about hardware components of units of the hardware device models;

determining, by the plurality of microservices based on the details from the retrieved hardware BOMs, policies to apply to a deployment of the virtual infrastructure on the plurality of hardware devices, including one or more first policies to apply according to first sections of the retrieved hardware BOMs and one or more second policies to apply according to second sections of the retrieved hardware BOMs; and deploying, by the plurality of microservices, the virtual infrastructure on the plurality of hardware devices according to the determined policies, wherein the first microservice deploys the virtual infrastructure through a deployment software according to the one or more first policies, and the second microservice deploys the virtual infrastructure through the deployment software according to the one or more second policies.

2. The method of claim 1, wherein the subset of the plurality of hardware BOMs is retrieved from a a software provider platform that deploys the virtual infrastructure through the deployment software, the software provider platform only storing hardware BOMs for hardware device models approved according to a certification process of the software provider, and wherein in a group of hardware devices specified by the user including the plurality of hardware devices, there is at least one hardware device not corresponding to any of the plurality of hardware BOMs, and the at least one hardware device is not one of the plurality of hardware devices.

3. The method of claim 1, wherein the subset of the plurality of hardware BOMs is retrieved from a software provider platform that deploys the virtual infrastructure through the deployment software, the plurality of hardware devices including all of a group of hardware devices specified by the user.

4. The method of claim 1, wherein a software provider platform stores the plurality of hardware BOMs, one or more of the plurality of hardware BOMs corresponding to hardware device models from a first hardware provider, and another one or more of the plurality of hardware BOMs corresponding to hardware device models from a second hardware provider.

5. The method of claim 1, further comprising:

locating a list of tasks corresponding to a software BOM that includes an arrangement for the deployment software, wherein deploying the virtual infrastructure comprises executing the located list of tasks of the software BOM on the deployment software.

6. The method of claim 1, wherein the hardware components include storage devices, and the details about the hardware components from the retrieved hardware BOMs include storage device types or storage device capacities, the method further comprising:

aggregating storage resources of the storage devices, wherein one of the determined policies is to deploy the virtual infrastructure by reserving a predetermined amount of the aggregated storage resources for virtual computing instances without exceeding a threshold.

7. The method of claim 1, wherein the hardware components include storage devices, and the details about the hardware components from the retrieved hardware BOMs include storage device types or storage device capacities, the method further comprising:

aggregating storage resources of the storage devices, wherein one of the determined policies is to deploy the virtual infrastructure in a manner that achieves a predetermined efficiency of storing data in the storage devices and a predetermined redundancy of storing data in the storage devices.

8. The method of claim 1, wherein the hardware components include central processing units (CPUs), and the details about the hardware components from the retrieved hardware BOMs include numbers of CPU cores or CPU clock speeds, the method further comprising:

aggregating compute resources of the CPUs, wherein one of the determined policies is to deploy the virtual infrastructure by reserving a predetermined amount of the aggregated compute resources for virtual computing instances without exceeding a threshold.

9. The method of claim 1, wherein the hardware components include network interface cards (NICs), and the details about the hardware components from the retrieved hardware BOMs include numbers of ports in the NICs or bandwidths supported by the ports in the NICs, the method further comprising:

determining the numbers of ports in the NICs or the bandwidths supported by the ports in the NICs, wherein one of the determined policies is to deploy the virtual infrastructure by creating network connections for each of the ports of the NICs in a manner that avoids overloading the bandwidths supported by the ports of the NICs.

10. One or more non-transitory computer-readable media comprising instructions that are executable in a computer system, wherein the instructions when executed cause the computer system to carry out a method of deploying virtual infrastructure of a software provider by a plurality of microservices including a first microservice and a second microservice, the virtual infrastructure being deployed on hardware infrastructure of the computer system to support execution of software on the virtual infrastructure, and wherein the method comprises:

retrieving, from a plurality of hardware bills of materials (BOMs), a subset of the plurality of hardware BOMs associated with a plurality of hardware devices of a user of the virtual infrastructure, by matching specified identifying information of the plurality of hardware devices to identifying information contained in the retrieved hardware BOMs, each of the retrieved hardware BOMs corresponding to a hardware device model of one or more of the plurality of hardware devices and comprising details about hardware components of units of the hardware device models;

determining, by the plurality of microservices based on the details from the retrieved hardware BOMs, policies to apply to a deployment of the virtual infrastructure on the plurality of hardware devices, including one or more first policies to apply according to first sections of the retrieved hardware BOMs and one or more second policies to apply according to second sections of the retrieved hardware BOMs; and deploying, by the plurality of microservices, the virtual infrastructure on the plurality of hardware devices according to the determined policies, the first microservice deploying the virtual infrastructure through a deployment software according to the one or more first policies, and the second microservice deploying the virtual infrastructure through the deployment software according to the one or more second policies.

11. The one or more non-transitory computer-readable media of claim 10, wherein the subset of the plurality of hardware BOMs is retrieved from a software provider platform that deploys the virtual infrastructure through the deployment software, the software provider platform only storing hardware BOMs for hardware device models approved according to a certification process of the software provider, and wherein in a group of hardware devices specified by the user including the plurality of hardware devices, there is at least one hardware device not corresponding to any of the plurality of hardware BOMs, and the at least one hardware device is not one of the plurality of hardware devices.

12. The one or more non-transitory computer-readable media of claim 10, wherein the subset of the plurality of hardware BOMs is retrieved from a software provider platform that deploys the virtual infrastructure through the deployment software, the plurality of hardware devices including all of a group of hardware devices specified by the user.

13. The one or more non-transitory computer-readable media of claim 10, wherein a software provider platform stores the plurality of hardware BOMs, one or more of the plurality of hardware BOMs corresponding to hardware device models from a first hardware provider, and another one or more of the plurality of hardware BOMs corresponding to hardware device models from a second hardware provider.

14. A computer system comprising:

a hardware platform of a software provider; and a plurality of hardware devices of a user on which a virtual infrastructure of the software provider is to be deployed, wherein one or more processors of the computer system are configured to perform a method of deploying the virtual infrastructure by a plurality of microservices including a first microservice and a second microservice, the virtual infrastructure to be deployed on the plurality of hardware devices to support execution of software on the virtual infrastructure, and wherein the method comprises:

retrieving, from a plurality of hardware bills of materials (BOMs), a subset of the plurality of hardware BOMs associated with the plurality of hardware devices, by matching specified identifying information of the plurality of hardware devices to identifying information contained in the retrieved hardware BOMs, each of the retrieved hardware BOMs corresponding to a hardware device model of one or more of the plurality of hardware devices and comprising details about hardware components of units of the hardware device model;

determining, by the plurality of microservices, based on the details from the retrieved hardware BOMs, policies to apply to a deployment of the virtual infrastructure on the plurality of hardware devices, including one or more first policies to apply according to first sections of the retrieved hardware BOMs and one or more second policies to apply according to second sections of the retrieved hardware BOMs; and deploying, by the plurality of microservices, the virtual infrastructure on the plurality of hardware devices according to the determined policies, the first microservice deploying the virtual infrastructure through a deployment software according to the one or more first policies, and the second microservice deploying the virtual infrastructure through the deployment software according to the one or more second policies.

15. The computer system of claim 14, wherein the method further comprises:

locating a list of tasks corresponding to a software BOM that includes an arrangement for the deployment software, deploying the virtual infrastructure comprising executing the located list of tasks of the software BOM on the deployment software.

16. The computer system of claim 14, wherein the hardware components include storage devices, and the details about the hardware components from the retrieved hardware BOMs include storage device types or storage device capacities, and wherein the method further comprises:

aggregating storage resources of the storage devices, one of the determined policies being to deploy the virtual infrastructure by reserving a predetermined amount of the aggregated storage resources for virtual computing instances without exceeding a threshold.

17. The computer system of claim 14, wherein the hardware components include storage devices, and the details about the hardware components from the retrieved hardware BOMs include storage device types or storage device capacities, and wherein the method further comprises:

aggregating storage resources of the storage devices, one of the determined policies being to deploy the virtual infrastructure in a manner that achieves a predetermined efficiency of storing data in the storage devices and a predetermined redundancy of storing data in the storage devices.

18. The computer system of claim 14, wherein the hardware components include central processing units (CPUs), and the details about the hardware components from the retrieved hardware BOMs include numbers of CPU cores or CPU clock speeds, and wherein the method further comprises:

aggregating compute resources of the CPUs, one of the determined policies being to deploy the virtual infrastructure by reserving a predetermined amount of the aggregated compute resources for virtual computing instances without exceeding a threshold.

* * * * *